United States Patent [19]

Ebihara et al.

[11] Patent Number: 5,585,851
[45] Date of Patent: Dec. 17, 1996

[54] VIDEO SIGNAL TRANSMISSION APPARATUS AND VIDEO SYSTEM FOR TRANSMITTING VIDEO SIGNALS WITH LOWER BIT RATE

[75] Inventors: Norio Ebihara; Noboru Asamizuya; Yoshiyuki Sekine; Yasumasa Kodama, all of Kanagawa, Japan

[73] Assignee: Sony Corporation, Tokyo, Japan

[21] Appl. No.: 540,447

[22] Filed: Oct. 10, 1995

Related U.S. Application Data

[63] Continuation of Ser. No. 177,999, Jan. 6, 1994, abandoned.

[30] Foreign Application Priority Data

Jan. 13, 1993 [JP] Japan .................. 5-004256

[51] Int. Cl.$^6$ ........................................ H04N 7/12
[52] U.S. Cl. .................... 348/392; 348/393; 348/394
[58] Field of Search .................... 348/398, 392, 348/393, 394, 659, 660, 661, 455, 456, 488, 491; 358/335

[56] References Cited

U.S. PATENT DOCUMENTS

| | | | |
|---|---|---|---|
| 4,652,906 | 3/1987 | Baugh ........................ | 348/396 |
| 4,743,959 | 5/1988 | Frederiksen ................. | 348/416 |
| 4,774,566 | 9/1988 | Kawamura et al. ........... | 348/660 |
| 5,067,010 | 11/1991 | Ishii et al. .................. | 348/630 |
| 5,130,796 | 7/1992 | Isobe et al. ................. | 348/488 |
| 5,132,781 | 7/1992 | Shimokoriyama et al. ..... | 348/420 |
| 5,136,379 | 8/1992 | Ishii ............................ | 348/660 |
| 5,142,272 | 8/1992 | Kondo ........................ | 348/660 |
| 5,216,496 | 6/1993 | Miyamoto et al. ........... | 348/409 |
| 5,253,041 | 10/1993 | Wine et al. ................. | 348/419 |
| 5,305,112 | 4/1994 | Yamamoto et al. .......... | 348/441 |

*Primary Examiner*—Thai Q. Tran
*Assistant Examiner*—Anano Rao
*Attorney, Agent, or Firm*—Jay H. Maioli

[57] ABSTRACT

In a video system red, green, and blue color signals, which correspond to an output video signal, are offset-sampled and thereafter supplied to a switching circuit. The offset-sampled color signals reproduced from VTRs are supplied to the switching circuit. The offset-sampled color signals selected by the switching circuit are supplied to a special effect applying apparatus, and the processed color signals are supplied to the switching circuit. The offset-sampled color signals selected by the switching circuit are decoded by way of interpolation processing to obtain the output video signals.

7 Claims, 8 Drawing Sheets

CONFIGURATION OF AN EMBODIMENT

FIG.1 PRIOR ART

EXAMPLE OF CONFIGURATION OF CONVENTIONAL VIDEO SYSTEM

FIG.2

CONFIGURATION OF AN EMBODIMENT

FIG.3

SAMPLING PHASES OF R, G AND B

OFFSET-SAMPLING PHASES OF R, G AND B
(Non-interlace sampling, H shifts)

FIG. 4A

G offset

OFFSET-SAMPLING PHASES OF R, G AND B
(Non-interlace sampling, H and V shifts)

OFFSET-SAMPLING PHASES OF R, G AND B
(Interlaced sampling, H and V shifts)

First field     offset     Second field

G

FIG.7A offset

FIG.7D offset

CONFIGURATION OF HD CIRCUIT

VIDEO SIGNAL TRANSMISSION APPARATUS AND VIDEO SYSTEM FOR TRANSMITTING VIDEO SIGNALS WITH LOWER BIT RATE

This is a continuation of application Ser. No. 08/177,999 filed Jan. 6, 1994 now abandoned.

BACKGROUND OF THE INVENTION

The present invention relates to a video signal transmission apparatus for transmitting a video signal while suppressing a bit rate to a low value by utilizing the characteristics of the video signal, and also to a video system employing such a video signal transmitting apparatus.

Conventionally, various types of video signal transmitting apparatus have been proposed for transmitting video signals while suppressing bit rates to low values in accordance with the processes such as high efficiency coding by utilizing the characteristics of the video signals.

Figure 1:
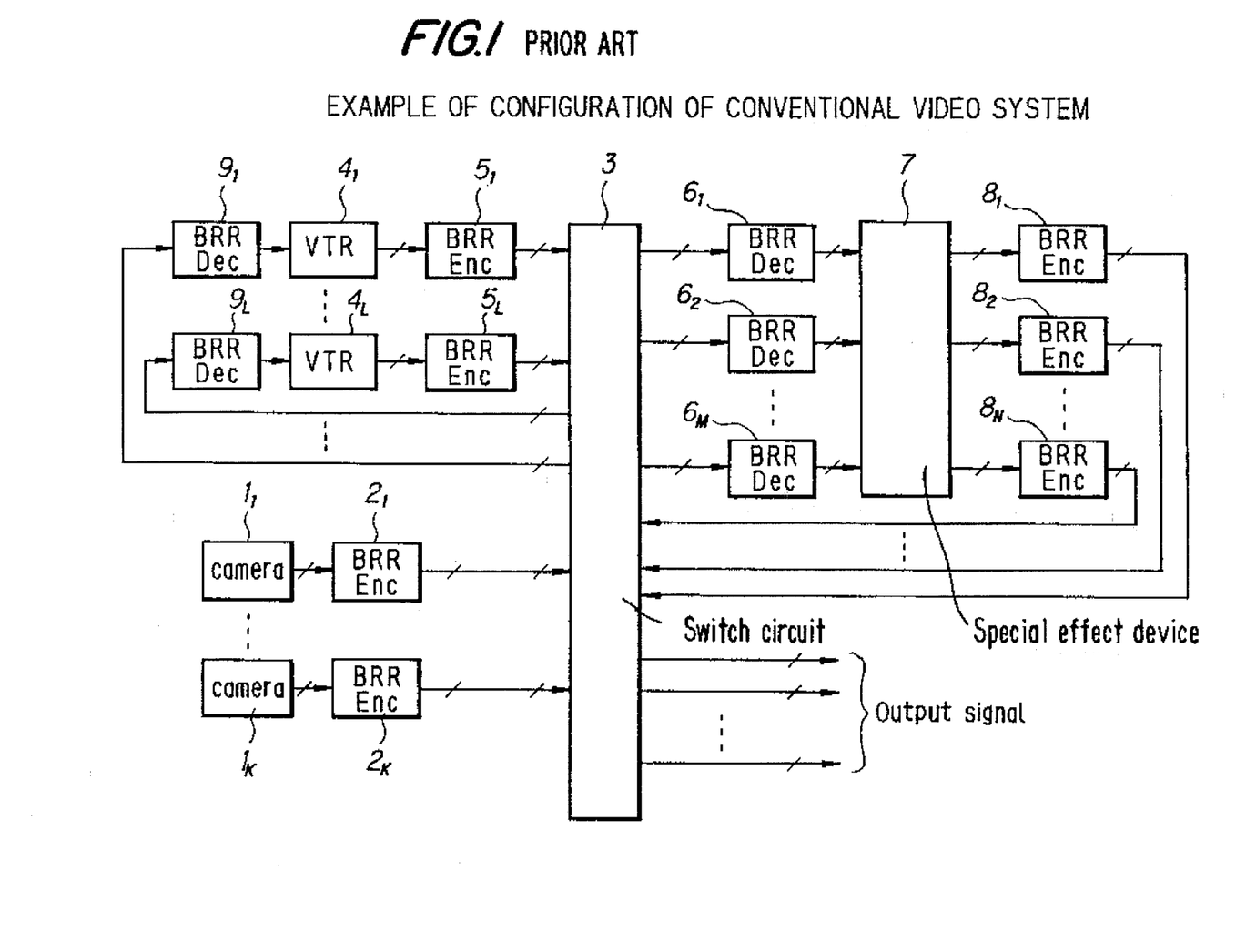
FIG. 1 is a schematic block diagram of the arrangement of the conventional video system.

FIG. 1 represents an example of an arrangement of a video system utilizing such a conventional video signal transmission apparatus. In this drawing, reference numerals "$1_1$" to "$1_K$" indicate video cameras, and the video signals (e.g., red, green, and blue color signals) output from these video cameras $1_1$ to $1_K$ are converted into digital video signals. After these digital video signals are processed by bit rate reduction encoders (referred to "BRR encoders" hereinafter) "$2_1$" to "$2_K$" where the bit rates of the digital video signals are lowered, the resulting digital video signals are supplied to a switch circuit 3.

Reference numerals "$4_1$" to "$4_L$" denote VTRs (video tape recorders). The video signals reproduced by these VTRs $4_1$ to $4_L$ are supplied to BRR encoders "$5_1$" to "$5_L$" by which the bit rates of these video signals are lowered in a similar manner to that of the above-described BRR encoders $2_1$ to $2_K$, whereby the processed video signals are supplied to the switch circuit 3. The video signals in the L-series which are selectively output from the switch circuit 3, are supplied to bit rate reduction decoders (referred to "BRR decoders" hereinafter) "$9_1$" to "$9_L$" by which these video signals are processed in a decoding process complementing the above-described encoding process of the BRR encoders $2_1$ to $2_K$ and $5_1$ to $5_K$. Thereafter, the resultant video signals are input into the VTRS $4_1$ to $4_L$ as recording signals.

The video signals in M-series selectively output from the switch circuit 3 are supplied to the BRR decoders $6_1$ to $6_M$, and processed in a manner complementing to that of the above-explained BRR encoders $2_1$ to $2_K$ and $5_1$ to $5_L$. Thereafter, the processed video signals are supplied to a special effect applying apparatus 7 also known as an effect switcher, or a digital multi-effector (DME).

The video signals in N-series to which either screen switching effects, or 3-dimensional effects are applied by this special effect applying apparatus, are furnished to the BRR encoders $8_1$ to $8_N$ by which the bit rate thereof is lowered in a manner similar to that of the BRR encoders $2_1$ to $2_K$, $5_1$ to $5_L$. The resulting video signals are supplied to the switch circuit 3. Then, the video signals in plural series which are selectively output from the switch circuit 3, are derived as the output signals.

After the video signals whose bit rate has been lowered are returned to the original conditions by employing the BRR decoders $6_1$ to $6_M$ in front of the special effect applying apparatus 7 and, the resultant video signal are processed in the specific effect because is that, if the specific effect process (non-linear process) is performed for the video signals whose bit rate has been lowered in the process of high-efficiency coding, the decoding operation would become difficult, resulting in serious deterioration of image qualities.

With the above-described circuit arrangement, both the video signals from the video cameras $1_1$ to $1_K$, the bit rate of which have been lowered in the BRR encoders $2_1$ to $2_K$, respectively, and also the video signals in L-series selected by the switch circuit 3 from the video signals that have been processed by the special effect applying apparatus 7 and the bit rates thereof are lowered thereafter by the BRR encoders $8_1$ to $8_N$, are returned to the original bit rate thereof by the BRR decoders $9_1$ to $9_L$, and the resulting video signals are input as the recording signals to the VTRs $4_1$ to $4_L$.

Also, the video signals from the video cameras $1_1$ to $1_K$ whose bit rate has been lowered by the BRR encoders $2_1$ to $2_K$, the video signals that have been processed in the special effect applying apparatus 7, and whose bit rate have been lowered by the BRR encoders $8_1$ to $8_N$, and furthermore the video signals in M-series selected by the circuit 3 from the video signals that have been reproduced by the VTRs $4_1$ to $4_L$ and whose bit rate have been lowered by the BRR encoders $5_1$ to $5_L$, are returned to the original bit rates thereof by the BRR decoders $6_1$ to $6_M$, and thereafter are supplied to the special effect applying apparatus 7 for applying the special effect thereto. As a result, the same video signals may pass through the special effect applying apparatus 7 multiple times.

Also, the video signals from the video cameras $1_1$ to $1_K$ whose bit rates have been lowered by the BRR encoders $2_1$ to $2_K$, the video signals that have been processed by the special effect applying apparatus 7, and whose bit rate has been lowered thereafter by the BRR encoders $8_1$ to $8_N$, and the video signals in plural series, which have been selected by the switch circuit 3 from the video signals whose bit rates have been lowered by the BRR encoders $5_1$ to $5_L$, are selectively output as the output signals.

As previously explained, a plurality of BRR decoders $6_1$ to $6_M$ are arranged in front of the special effect applying apparatus 7 and also a plurality of BRR encoders $8_1$ to $8_N$ are arranged following the special effect applying apparatus 7 in the video system shown in FIG. 1. Therefore, the problem is that the cost of these BRR decoders and BRR encoders is high, and thus the cost of the entire video system is high.

After the video signals whose bit rates have been lowered are returned to the original conditions by the BRR decoders $6_1$ to $6_M$, the resulting video signals are processed by the special effect applying apparatus 7. Because these video signals are processed in the special effect applying apparatus 7 under such conditions that the bit rate thereof is high, this special effect applying apparatus 7 requires a large complicated circuit, resulting in an expensive video system.

In the conventional video system of FIG. 1, when the video signals pass through the specific effect applying apparatus 7 multiple times, these video signals repeatedly pass through the BRR decoder and the BRR encoder. As a result, the quality of the video signals are greatly deteriorated, and therefore it is rather difficult to maintain good image qualities.

SUMMARY OF THE INVENTION

Accordingly, the present invention has been made in an attempt to solve the above-described conventional problems, and has an object to provide a video signal transmission apparatus capable of transmitting video signals while lowering a bit rate thereof and without increasing cost of an overall video system including, for instance, a special affect applying apparatus.

Another object of the present invention is to provide a video system in which even when video signals pass through a special effect applying apparatus multiple times, deterioration of the video signals is low, thereby maintaining better image qualities.

A video signal transmission apparatus according to a first invention is characterized by offset-sampling red, green and blue color signals for constituting a video signal to be transmitted.

A video system, according to a second invention, is comprised of:

signal generating means for outputting red, green, blue color signals to constitute a video signal;

sampling means for offset-sampling a plurality of red, green and, blue color signals output from the signal generating means;

first signal processing means for performing a special effect process with respect to the offset-sampled red, green and, blue color signals;

switching means for selectively outputting the offset-sampled red, green and, blue color signals derived from the sampling means and the first signal processing means; and second signal processing means for decoding the offset-sampled red, green and, blue color signals, wherein the offset-sampled red, green and, blue color signals selectively output by the switching means are supplied to the first and second signal processing means.

In accordance with the first invention, the red, green and, blue color signals R, G, B are offset-sampled to be transmitted. Then, it is possible to lower the bit rates of these offset-sampled color signals in a similar case of performing the conventional high-efficiency coding process.

Then, even when the offset-sampled color signals R, G, B are directly processed in the special effect applying apparatus, image quality is not deteriorated. Accordingly, there is no need for a plurality of BRR decoders as well as BRR encoders to be arranged before/after the special effect applying apparatus, respectively, in order to suppress the bit rate to the low value by way of the process of high-efficiency coding, and the video system can be made at low cost.

Because the process operation by the special effect applying apparatus can be performed under such condition that the bit rate is suppressed to the low value, the special effect applying apparatus can be made with a simple circuit, and also made at low cost.

In accordance with the second invention, the color signals R, G, B are offset-sampled to suppress the bit rate to the low value, and there is no need that the BRR decoders and the BRR encoders to be arranged before/after the special effect applying apparatus when the bit rate is suppressed to the low value by way of the high-efficiency coding. Even if the color signal R, G, B pass through the special effect applying apparatus several times, no signal deterioration is produced, thereby maintaining better image qualities.

Also, an interpolation process and the like are performed as the decoding process by utilizing correlation of the video signals, so that such color signals R, G, B having image qualities similar to those of the original color signals can be obtained.

BRIEF DESCRIPTION OF THE DRAWINGS

The above purposes and other useful features of the present invention will becomes more readily apparent in the following description and the accompanying drawings, in which.

DETAILED DESCRIPTION OF THE PREFERRED EMBODIMENTS

Figure 2:
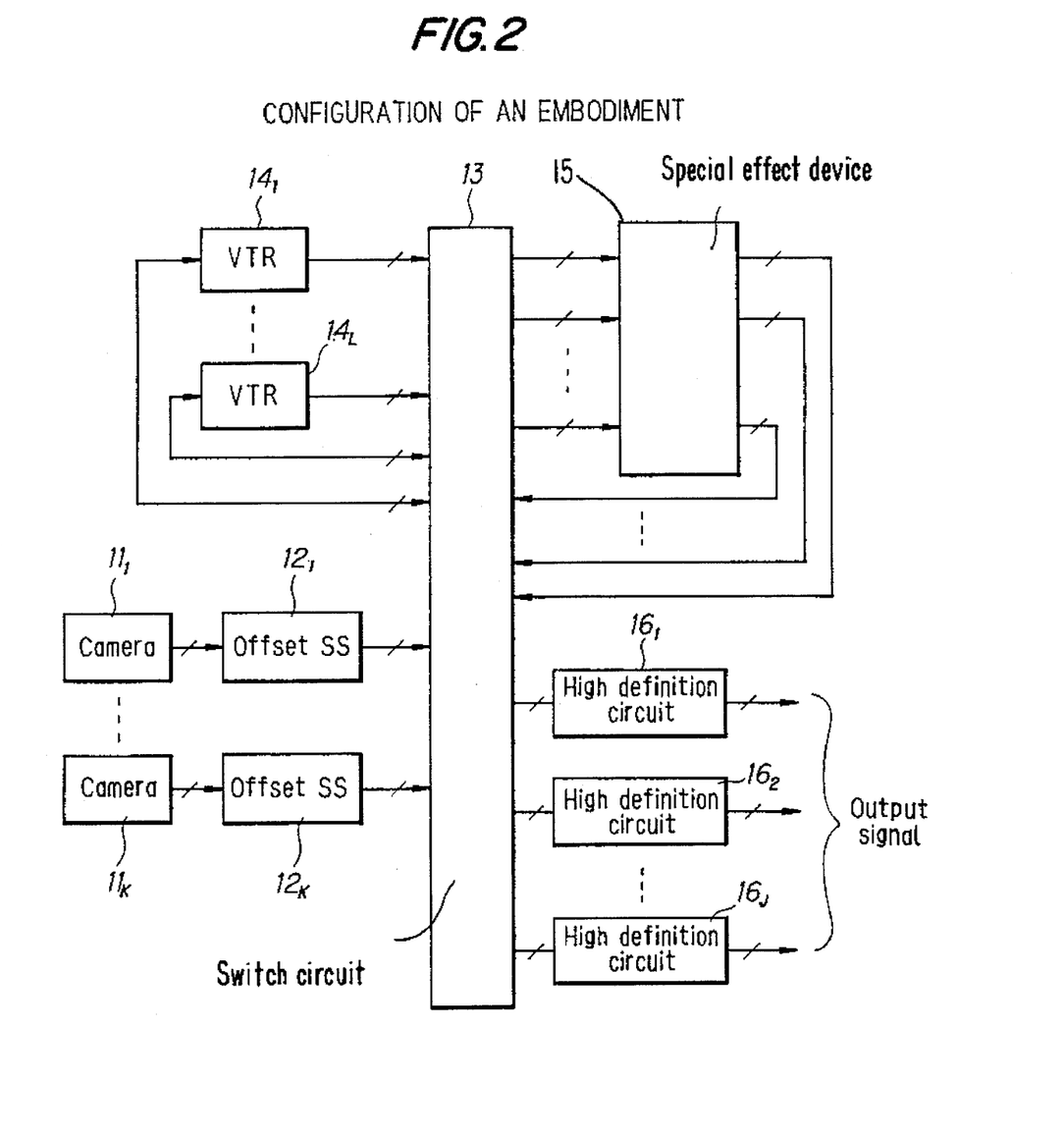
FIG. 2 is a schematic block diagram of an arrangement of a video system according to an embodiment of the present invention.

Referring now to FIG. 2, an embodiment of the present invention will be described.

In this drawing, reference numerals $11_1$ to $11_K$ are video cameras. Red, green, and blue color signals R, G, and B for constituting digital video signals output from these video cameras $11_1$ to $11_K$, are supplied to offset sampling circuits (referred to "OSS circuits" hereinafter) $12_1$ to $12_K$ to perform an offset sampling process. The offset-sampled color signals R, G, B derived from these OSS circuits $12_1$ to $12_K$ are supplied to a switching circuit 13.

Figure 3:
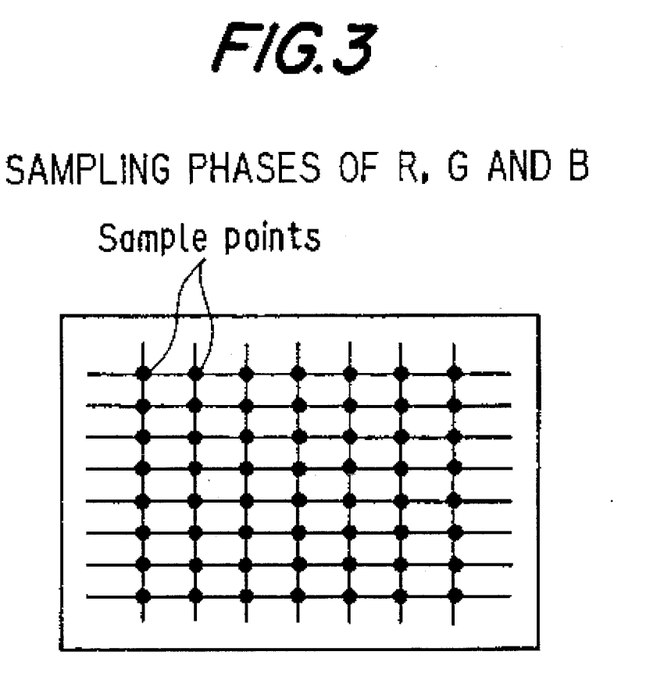
FIG. 3 schematically illustrates sampling phases of R, G, B color signals.

Here, the offset sampling process is carried out in the OSS circuits $12_1$ to $12_K$ as follows. FIG. 3 represents sampling phases of the digital R, G, B color signals outputted from the video cameras $11_1$ to $11_K$. It should be noted that points "." indicate sampling points in this drawing and similarly in the below-mentioned drawings to show sampling phases.

Figure 4A:
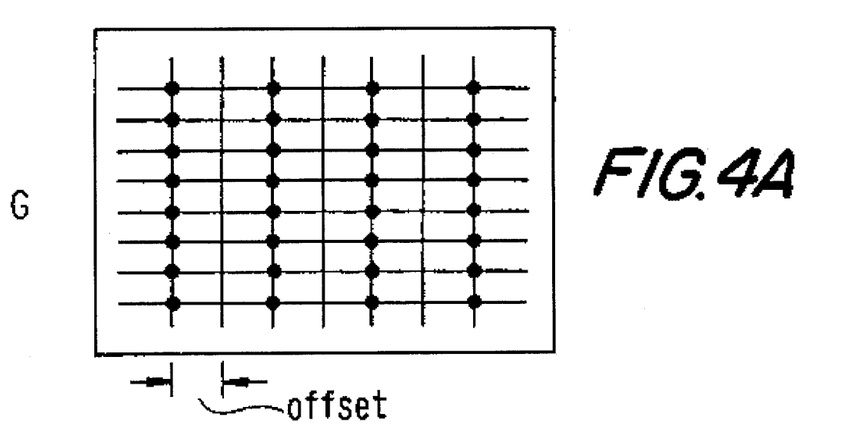
FIG. 4 schematically shows offset-sampling phases of R, G, B color signals (non-interlaced sampling, H shifts)
Figure 4B:
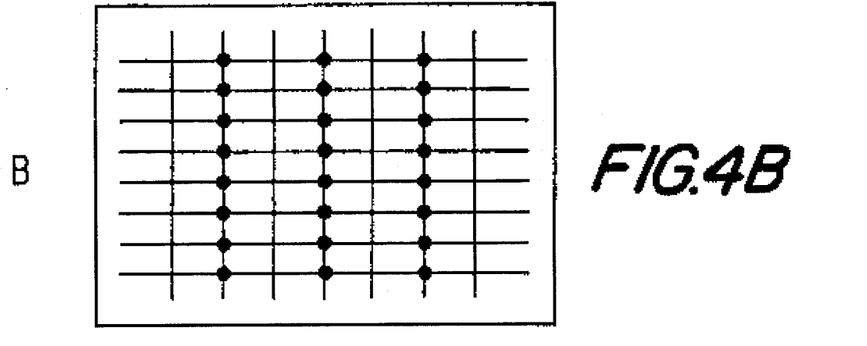
Figure 4C:
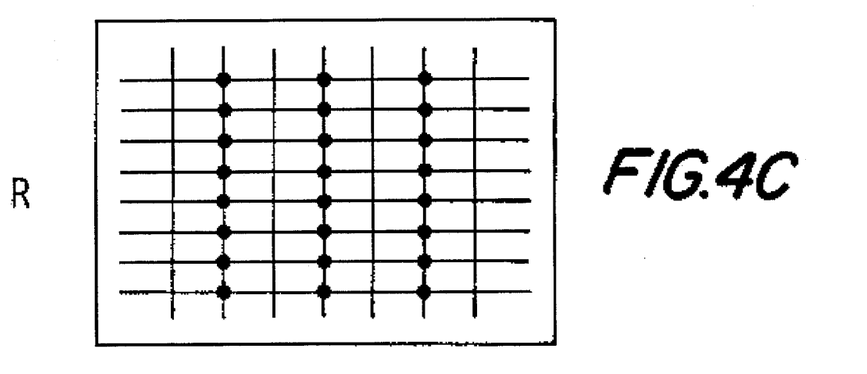
Figure 5A:
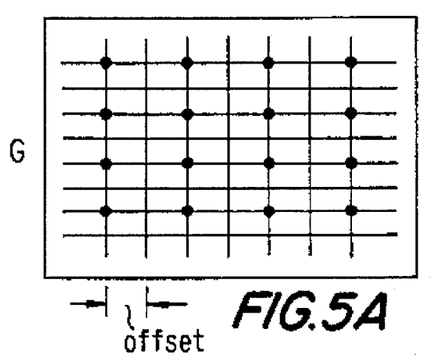
FIG. 5 schematically indicates offset-sampling phases of R, G, B color signals (interlaced sampling, H shifts)
Figure 5B:
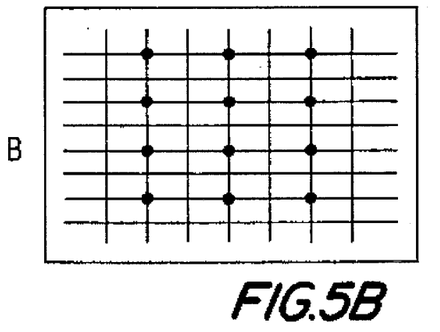
Figure 5C:
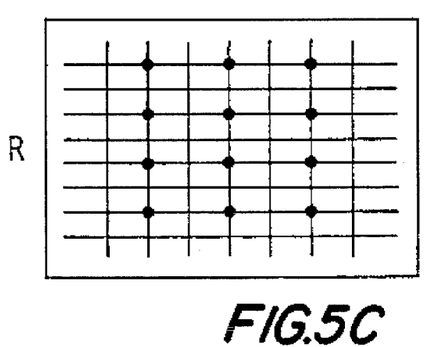
Figure 5D:
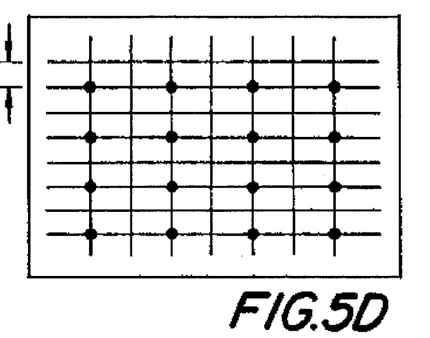
Figure 5E:
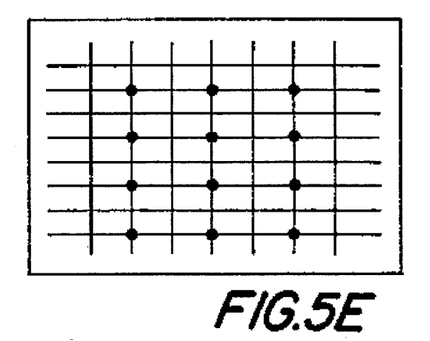
Figure 5F:
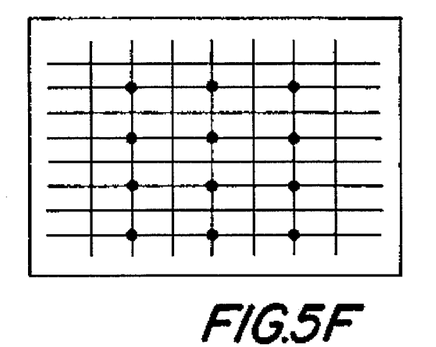

FIG. 4 schematically shows offset sampling phases of color signals R, G, B, in an example of non-interlaced sampling. The sampling process is performed in such a manner that both the red color signal R and the blue color signal B are offset along the horizontal direction (namely, H-shifted) with respect to the green color signal G. In other words, the sampling points are reduced, as compared with the sampling points of the output signals from the cameras.

FIG. 5 shows offset sampling phases of color signals R, G, B in an example of interlaced sampling constituted by first and second fields. In the respective fields, a sampling process is carried out in such a way that both the red signal R and the blue signal B are offset along the horizontal direction (namely, H-shifted) with respect to the green signal G.

Figure 6A:
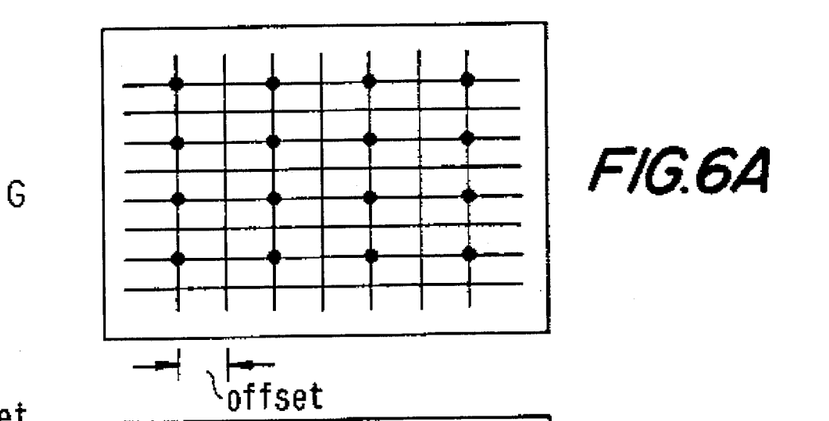
FIG. 6 schematically represents offset-sampling phases of R, G, B color signals (non-interlaced sampling, H and V shifts)
Figure 6B:
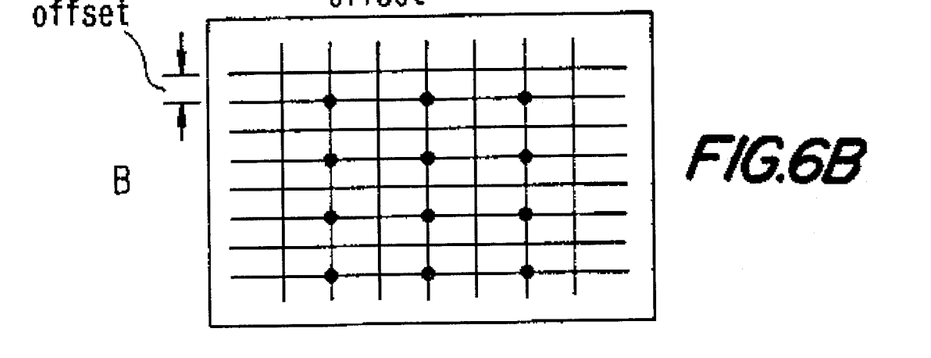
Figure 6C:
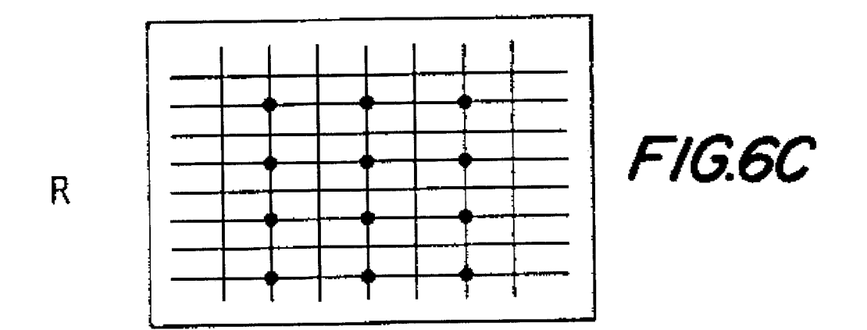
Figure 7A:
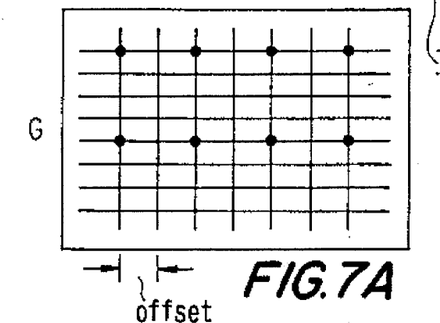
FIG. 7 schematically indicates offset sampling phases of R, G, B color signals (interlaced sampling, H and V shifts)
Figure 7B:
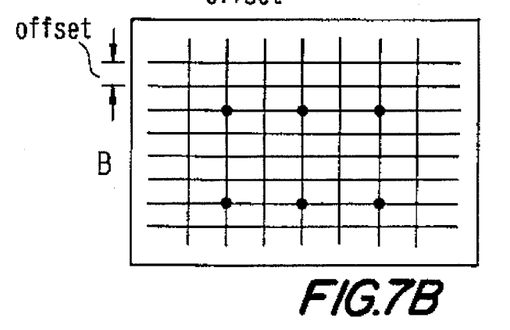
Figure 7C:
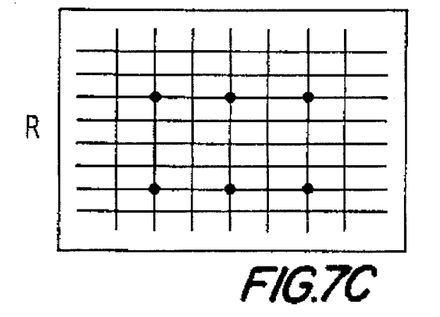
Figure 7D:
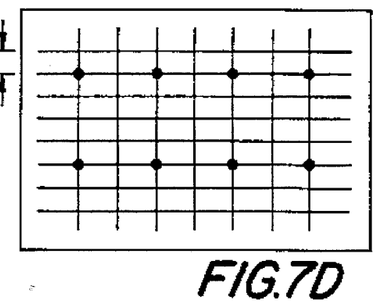
Figure 7E:
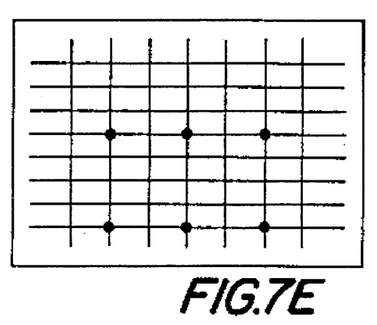
Figure 7F:
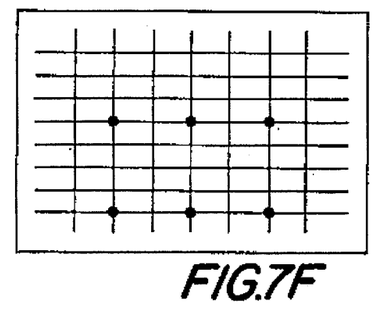

Similarly, FIG. 6 indicates offset sampling phases of color signals R, G, B in an example of non-interlaced sampling. The sampling process is performed in such a way that both the red signal R and the blue signal B are offset along both the horizontal and vertical directions (namely, H and V-shifted) with respect to the green signal G.

Further, FIG. 7 indicates offset sampling phases of color signals R, G, B in an example of interlaced sampling constituted by first and second fields. The sampling process is performed in such a manner that both the red color signal R and the blue color signal B are offset along both the horizontal and vertical directions (H and V-shifted) with respect to the green color signal G in the respective first and second fields.

It should be noted that the offset sampling process is not limited to the above-described examples shown in FIGS. 4 to 7. For instance, although both the color signal R and the blue color signal B are offset with respect to the green color signal G in the above-described embodiments, a sampling process may be achieved wherein the color signals R, G, B are mutually offset.

In some of the above-described examples, the color signals are offset only in the horizontal direction (H-shifted), (refer to FIGS. 3 and 4). Alternatively, the sampling may be carried out in such a manner that the color signals are offset only in the vertical direction (namely, V-shifted).

Referring back to FIG. 2, reference numerals $14_1$ to $14_L$ denote VTRs (video tape recorders). The offset-sampled color signals R, G, B reproduced from these VTRs $14_1$ to $14_L$ are supplied to the switching circuit 13. The color signals R, G, B in the L-series which have been offset-sampled and selectively output from the switching circuit 13, are input as the recording signals into the VTRs $14_1$ to $14_L$.

The color signals in the plural series which have been offset-sampled and are selectively output from the switching circuit 13, are supplied to a special effect applying apparatus 15 called an effect switcher and a digital multi effector (DME) and so on. The resultant color signals R, G, B in the plural series to which the screen changing effect and the three-dimensional effect have been applied by this special effect applying apparatus 15, are supplied to the switching circuit 13.

Also, the color signals R, G, B in a J-series which have been offset-sampled and are selectively output from the switching circuit 13, are furnished to high definition processing circuit (referred to an "HD processing circuit" hereinafter) $16_1$ to $16_J$, in which the decoding process of the sampling process is performed for the supplied color signals. Then, the HD-processed color signals are derived as output signals from the HD processing circuits $16_1$ to $16_J$. In these HD processing circuits $16_1$ to $16_J$, interpolation processing operation by utilizing correlation of the video signals is performed as the decoding process.

Figure 8:
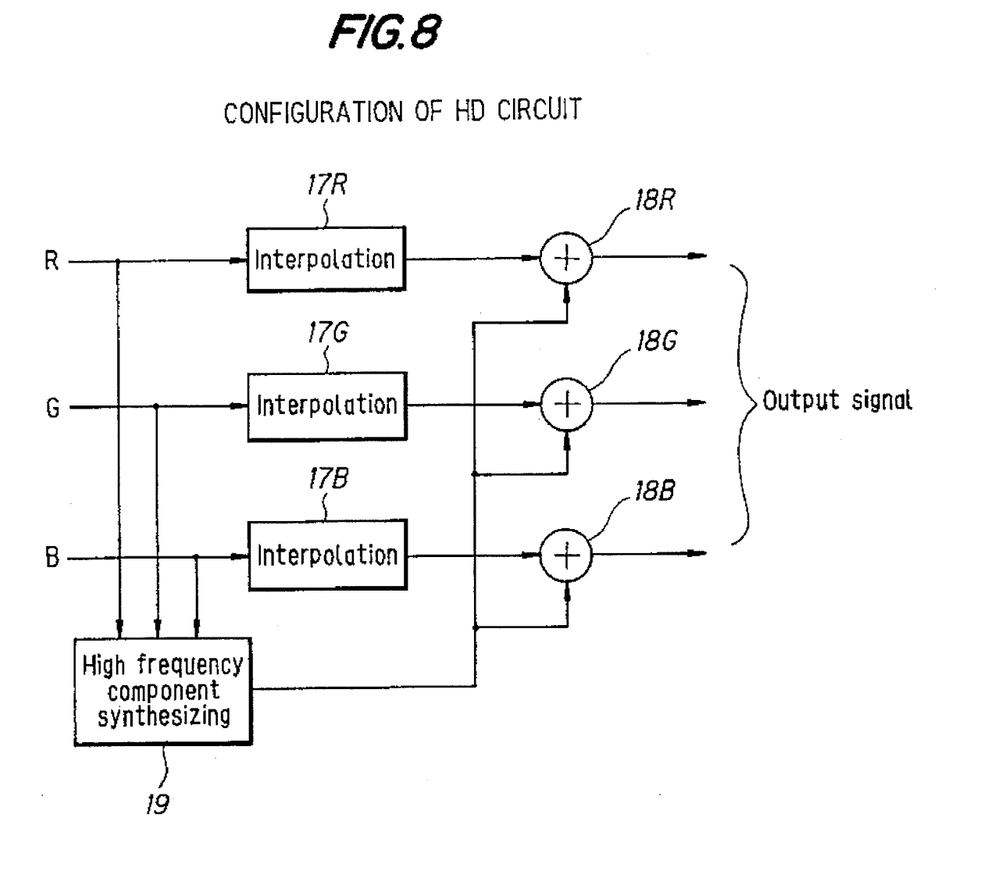
FIG. 8 is a schematic block diagram for indicating an arrangement of a high definition processing circuit.

FIG. 8 represents a concrete arrangement of the HD proceeding circuits $16_1$ to $16_J$. The offset-sampled color signals R, G, B are supplied to interpolation circuits 17R, 17G, 17B, respectively. In the interpolation circuits 17R, 17G, 17B, the interpolation process utilizing signals around the sampling points is performed in such a way that the sampling number becomes the original sampling number and the bit rate is returned to the original bit rate. The color signals R, G, B output from these interpolation circuits 17R, 17G, 17B are supplied to adders 18R, 18G, 18B, respectively.

The offset-sampled color signals R, G, B also supplied to a high-frequency component synthesizing circuit 19. In the synthesizing circuit, high frequency components of the respective color signals R, G, B are extracted and then synthesized with each other. The synthesized signal of the high frequency components for the color signals derived from synthesizing circuit 19, is commonly supplied to the adders 18R, 18G, 18B. Subsequently, the synthesized signal of the high frequency components for the color signals R, G, B is added to the color signals R, G, B, the bit rate of which has been returned to the original bit rates, in the adders 18R, 18G, 18S. The resultant addition signals are handled as output signals.

With the above-described circuit arrangement, the color signals R, G, B offset-sampled in the offset sampling circuits $12_1$ to $12_K$, and the color signals R, G, B in the L-series which are selected by the switching circuit 13 from the offset-sampled color signals R, G, B processed by the special effect applying apparatus 15, are furnished as the recording signals to the VTRs $14_1$ to $14_L$.

Also, both the color signals R, G, B offset-sampled in the offset sampling circuit $12_1$ to $12_K$, and the color signals R, G, B in the K-series selected by the switching circuit 13 from the color signals R, G, B which have been offset-sampled and processed by the special effect applying apparatus 15, are supplied to the special effect applying apparatus 15, whereby the special effect is applied to these color signals. As a result, there are some possibilities that the same color signals R, G, B pass through the special effect applying apparatus 15 several times.

Then, the color signals R, G, B offset-sampled by the offset sampling circuits $12_1$ to $12_K$, the offset-sampled color signals R, G, B processed in the special effect applying apparatus 15, and the color signals R, G, B in the J-series selected by the switching circuit 13 from the offset-sampled color signals R, G, B reproduced by the VTRs $14_1$ to $14_L$ are supplied to the HD processing circuits $16_1$ to $16_J$ by which the decoding process for the offset sampling is carried out, thereby producing output signals.

In this embodiment, the color signals R, G, B output from the video cameras $11_1$ to $11_K$ are offset-sampled by the offset sampling circuits $12_1$ to $12_K$ to reduce the sampling number thereof, and then the offset-sampled color signals are transmitted. As a consequence, the color signals can be transmitted while suppressing the bit rate to the small value in a similar manner that the conventional process of high efficiency coding operation is carried out.

Because the bit number of a single sample about the offset-sampled color signals R, G, B is identical to the original bit number, even when these color signals are directly processed in the special effect applying apparatus 15, there is no risk to cause image qualities of these color signals to be deteriorated. Therefore, according to this embodiment, there is no need for a plurality of BRR decoders to be arranged in front of the special effect applying apparatus 15 and also a plurality of BRR encoders to be arranged after the special effect applying apparatus 15 so as to suppress the bit rates to low values in the high efficiency encoding process. The entire video system can be made at low cost.

Since the process operation can be performed in the special effect applying apparatus 15 under such a condition that the bit rate of the color signals is lowered, the circuit scale of the specific applying apparatus 15 can be made small, and a low cost of the video system can be realized.

Furthermore, the bit rate is suppressed to the low value by offset-sampling the color signals R, G, B in accordance with this embodiment. Thus, there is no need in case of suppressing the bit rate to the low value by the high efficiency coding process for the BRR decoders to be arranged in front of the special effect applying apparatus 15 and the BRR encoders to be arranged after the special effect applying apparatus 15. Even when the color signals R, G, B pass through this special effect applying apparatus 15 several times, no signal deterioration occurs and a better image qualities can be maintained.

In addition, according to this embodiment, the interpolation process utilizing correlation of the video signals is carried out as the decoding process to return the sampling number into the original sampling number, so that the bit rate is returned to the original bit rate. Accordingly, color signals having the image qualities similar to those of the original color signals R, G, B can be obtained.

It should be noted that although, for the sake of simplicity, a single special effect applying apparatus 15 has been connected to the switching circuit 13 in the above-described embodiment, the present invention may be similarly applied to a circuit arrangement wherein a plurality of special effect applying apparatuses are connected to the switching circuit 13.

According to the present invention, the red, green and, blue color signals are offset-sampled to reduce the sampling number and the resultant color signals are transmitted, so that the bit rate thereof can be suppressed to low values in a similar case that the conventional high-efficiency coding process is performed.

Because the bit number of a single sample about the offset-sampled color signals R, G, B is identical to the original bit number, there is no need for a plurality of BRR decoders to be arranged in front of the special effect applying apparatus and also a plurality of BRR encoders to be arranged after the special effect applying apparatus so as to suppress the bit rates to low-values in the high efficiency encoding process. The entire video system can be made at low cost.

Because the process operation can be performed in the special effect applying apparatus under such a condition that the bit rate of the color signals is lowered, the circuit scale of the special applying apparatus can be made small, and low cost of the video system can be realized.

Furthermore the bit rate is suppressed to the low value by offset-sampling the color signals in accordance with this invention. Thus, there is no need in case of suppressing the bit rate to the low value by the high efficiency coding process for the BRR decoders to be arranged in front of the special effect applying apparatus 15 and the BRR encoders to be arranged after the special effect applying apparatus. Even when the color signals pass through this special effect applying apparatus several times, no signal deterioration occurs and better image qualities can be maintained.

The interpolation process utilizing correlation of the video signals is carried out as the decoding process to return the sampling number into the original sampling number, so that the bit rate is returned to the original bit rate. Accordingly, color signals having the image qualities similar to those of the original color signals can be obtained.

What is claimed is:

1. A video signal transmission apparatus comprising:

a plurality of color signal generating sources each for outputting red, green, and blue color signals, which constitute a respective plurality of video signals;

sampling means for offset-sampling the red, green, and blue color signals output by the plurality of color signal generating sources, the sampling of the red color signal and the blue color signal being offset along one of a horizontal direction and a vertical direction with respect to the sampling of the green color signal, the offset-sampled red, green, and blue color signals having a lower bit rate than the red, green and blue color signals output by the plurality of color signal generating sources;

special effect processing means for performing a special effect process on the offset-sampled red, green, and blue color signals and producing processed output signals therefrom; and transmitting means for transmitting the offset-sampled red, green, and blue color signals and the processed output signals.

2. A signal transmission apparatus as claimed in claim 1, further comprising decoding means for performing a decoding process of the offset-sampled color signals and the processed output signals, wherein the decoding means supplies decoded color signals having a bit rate equal to a bit rate of the color signals output by the plurality of color signal generating sources.

3. A signal transmission apparatus as claimed in claim 2, wherein the decoding means includes synthesizing means for extracting high-frequency components from the offset-sampled color signals and the processed output signals.

4. A signal transmission apparatus as claimed in claim 1, wherein in the offset-sampling by the sampling means the red color signal and the blue color signal are offset along both a horizontal direction and a vertical direction with respect to the green color signal.

5. A video system comprising:

a plurality of color signal generating sources each for outputting red, green, and blue color signals which constitute a respective plurality of video signals;

sampling means for offset-sampling the red, green, and blue color signals output by the plurality of color signal generating sources, the sampling of the red color signal and the blue color signal being offset along one of a horizontal direction and a vertical direction with respect to the sampling of the green color signal, the offset-sampled red, green, and blue color signals having a lower bit rate than the red, green and blue color signals output by the plurality of color signal generating sources;

first signal processing means for performing a special effect process on the offset-sampled red, green, and blue color signals from the sampling means and producing processed output signals therefrom;

switching means for selectively outputting the offset-sampled red, green, and blue color signals from the sampling means and the processed output signals from the first signal processing means; and second signal processing means for decoding the offset-sampled red, green, and blue color signals, selectively output by the switching means, and supplying decoded color signals having a bit rate equal to a bit rate of the color signals output by the plurality of color signal generating sources.

6. A video system as claimed in claim 5, wherein the second signal processing means includes synthesizing means for extracting high frequency components from the offset-sampled signals selectively output by the switching means.

7. A video system as claimed in claim 5, wherein in the offset-sampling by the sampling means the red color signal and the blue color signal are offset along both a horizontal direction and a vertical direction with respect to the green color signal.

\* \* \* \* \*